US010616528B2

(12) United States Patent
Gurr et al.

(10) Patent No.: US 10,616,528 B2
(45) Date of Patent: Apr. 7, 2020

(54) GRAPHICAL DISPLAY SUPPORTING MULTI-LOCATION CAMERA

(71) Applicant: Microsoft Technology Licensing, LLC, Redmond, WA (US)

(72) Inventors: Kae-Ling Jacquline Gurr, Seattle, WA (US); Eric Paul Witt, Redmond, WA (US); Ryan Eugene Whitaker, Seattle, WA (US); Scott Schenone, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/993,089

(22) Filed: May 30, 2018

(65) Prior Publication Data

US 2019/0373214 A1   Dec. 5, 2019

(51) Int. Cl.
| | |
|---|---|
| *H04N 7/14* | (2006.01) |
| *H04N 5/44* | (2011.01) |
| *H04N 7/15* | (2006.01) |
| *H04N 5/232* | (2006.01) |
| *H04N 5/225* | (2006.01) |

(52) U.S. Cl.
CPC ........... *H04N 7/142* (2013.01); *H04N 5/2253* (2013.01); *H04N 5/23216* (2013.01); *H04N 5/4403* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 6,208,373 | B1 * | 3/2001 | Fong | H04N 7/144 348/14.03 |
| 6,507,356 | B1 * | 1/2003 | Jackel | H04N 7/142 348/14.01 |

(Continued)

FOREIGN PATENT DOCUMENTS

| | | |
|---|---|---|
| CN | 206133361 U | 4/2017 |
| GB | 2446612 A | 8/2008 |
| WO | 2015116127 A1 | 8/2015 |

OTHER PUBLICATIONS

MDPI (by Kreinneier et al)—an Evaluation of Capacitive Markers, pp. 1-18 (Year: 2017).*

(Continued)

*Primary Examiner* — Phung-Hoang J Nguyen
(74) *Attorney, Agent, or Firm* — Alleman Hall Creasman & Tuttle LLP (57) ABSTRACT

A computing system includes a display and a sensor system. The sensor system includes a plurality of sensors distributed at respective locations relative to the display to detect a presence of a structural feature of a camera device. The computing system further includes a computing device that receives an output from one or more sensors of the sensor system indicative of the presence of the structural feature of the camera device. The computing device determines a location of the camera device relative to the display based on the output received from the one or more sensors. The computing device presents a graphical user interface (GUI) window for the camera device via the display at a location that is based on the location of the camera device.

20 Claims, 8 Drawing Sheets

(56) References Cited

U.S. PATENT DOCUMENTS

| | | | |
|---|---|---|---|
| 7,563,040 B2 | 7/2009 | Tsai et al. | |
| 8,248,521 B2 | 8/2012 | Lin et al. | |
| 8,711,201 B2 | 4/2014 | Gorzynski | |
| 9,571,708 B2 | 2/2017 | Haddad | |
| 9,653,844 B1 | 5/2017 | Szeto | |
| 2005/0284993 A1 | 12/2005 | Ternus et al. | |
| 2009/0167840 A1* | 7/2009 | Lin | H04L 51/04 |
| | | | 348/14.08 |
| 2011/0193935 A1* | 8/2011 | Gorzynski | H04N 7/142 |
| | | | 348/14.08 |
| 2012/0069503 A1 | 3/2012 | Lauder et al. | |
| 2012/0169838 A1* | 7/2012 | Sekine | H04N 7/144 |
| | | | 348/14.16 |
| 2012/0208514 A1 | 8/2012 | Park et al. | |
| 2012/0242777 A1* | 9/2012 | Yu | H04N 7/147 |
| | | | 348/14.07 |
| 2016/0082896 A1 | 3/2016 | Mouser et al. | |
| 2017/0068417 A1 | 3/2017 | Ida et al. | |
| 2018/0074639 A1 | 3/2018 | Powell et al. | |
| 2018/0098029 A1* | 4/2018 | Cassini | H04N 7/152 |
| 2018/0181199 A1* | 6/2018 | Harvey | G06T 19/006 |

OTHER PUBLICATIONS

"Oppo N3 with 16-Megapixel Rotating Camera Launched at Rs. 42,990", Retrieved from: https://gadgets.ndtv.com/mobiles/news/oppo-n3-with-16-megapixel-rotating-camera-launched-at-rs-42990-679166, Apr. 8, 2015, 7 Pages.

"International Search Report and Written Opinion Issued in PCT Application No. PCT/US2019/031927", dated Nov. 7, 2019, 21 pages.

* cited by examiner

GRAPHICAL DISPLAY SUPPORTING MULTI-LOCATION CAMERA

BACKGROUND

Video conferencing enables people to communicate in real-time through the sharing of video captured by a camera. Both cameras and graphical displays may be integrated into personal computers or may take the form of separate peripheral devices. In either configuration, the camera may be located near the graphical display during conferencing so that the subject can view a remote camera feed presented by the graphical display while also being within the frame of the camera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to an aspect of the present disclosure, a computing system includes a display and a sensor system. The sensor system includes a plurality of sensors distributed at respective locations relative to the display to detect a presence of a structural feature of a camera device. The computing system further includes a computing device that receives an output from one or more sensors of the sensor system indicative of the presence of the structural feature of the camera device. The computing device determines a location of the camera device relative to the display based on the output received from the one or more sensors. The computing device presents a graphical user interface (GUI) window for the camera device via the display at a location that is based on the location of the camera device.

DETAILED DESCRIPTION

Figure 1:
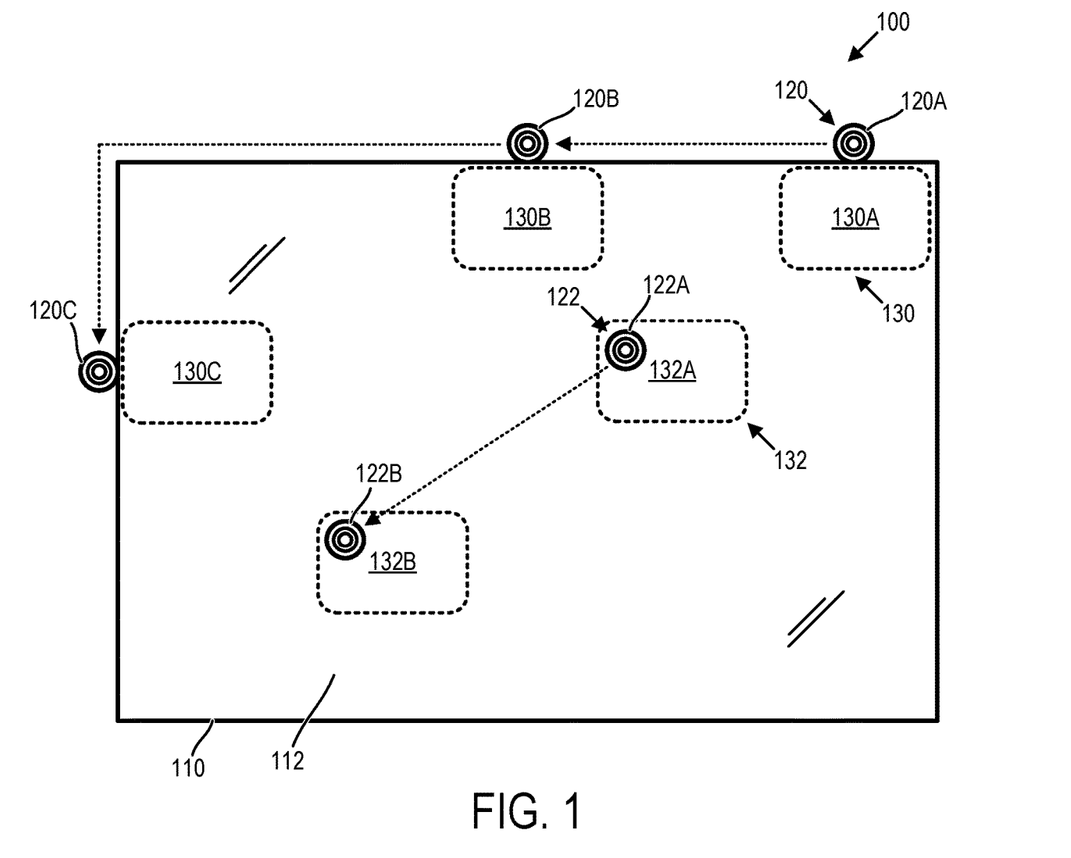
FIG. 1 depicts example interactions between a display device and a camera device of a computing system.

FIG. 1 depicts example interactions between a display device 110 and a camera device 120 of a computing system 100. Camera device 120 is moveable relative to display device 110, as indicated by camera 120 being moved between locations denoted as 120A, 120B, and 120C, for example.

Display device 110 includes a graphical display 112 (i.e., a display) defining a display region. Display device 110 may present graphical content via graphical display 112. In this example, graphical display 112 extends to an edge of display device 110 in which a bezel of the display device partially or fully resides behind a face of graphical display 110 when viewed from a front side of the graphical display. This configuration may enable multiple display devices to be tiled to form a larger composite graphical display while minimizing or even eliminating visibility of the bezel. However, display device 110 may have other configurations, including a configuration in which graphical display 112 is surrounded by a more substantial bezel that places an exterior edge of graphical display 112 inward from an exterior edge of display device 110 when viewed from a front side of the graphical display.

The graphical content presented via graphical display 112 may include one or more graphical user interface (GUI) windows. For example, a GUI window 130 for camera device 120 may be presented via graphical display 112 at a location that is based on the location of the camera device. In FIG. 1, GUI window 130 is moved between locations denoted as 130A, 130B, and 130C as camera device 120 is moved between locations 120A, 120B, and 120C, respectively. In this example, camera device 120 is moved along an exterior edge of display device 110, and GUI window 130 is presented directly beside or proximate to camera device 120 via graphical display 112.

FIG. 1 further depicts another example interaction in which camera device 122 is mounted to or rests upon display device 110 within a display region defined by graphical display 112. In this example, camera device 122 is again moveable relative to display device 110, as indicated by camera 122 being moved between locations denoted as 122A and 122B. Further, a GUI window 132 for camera device 122 is presented via graphical display 112 at a location that is based on the location of the camera device. Here, as camera device 122 is moved between locations 122A and 122B, GUI window 132 is moved between locations 132A and 132B, respectively. In this example, because camera device 122 is located within the display region of graphical display 112, it is possible to present graphical content that fully surrounds or partially surrounds camera device 112.

Figure 2:
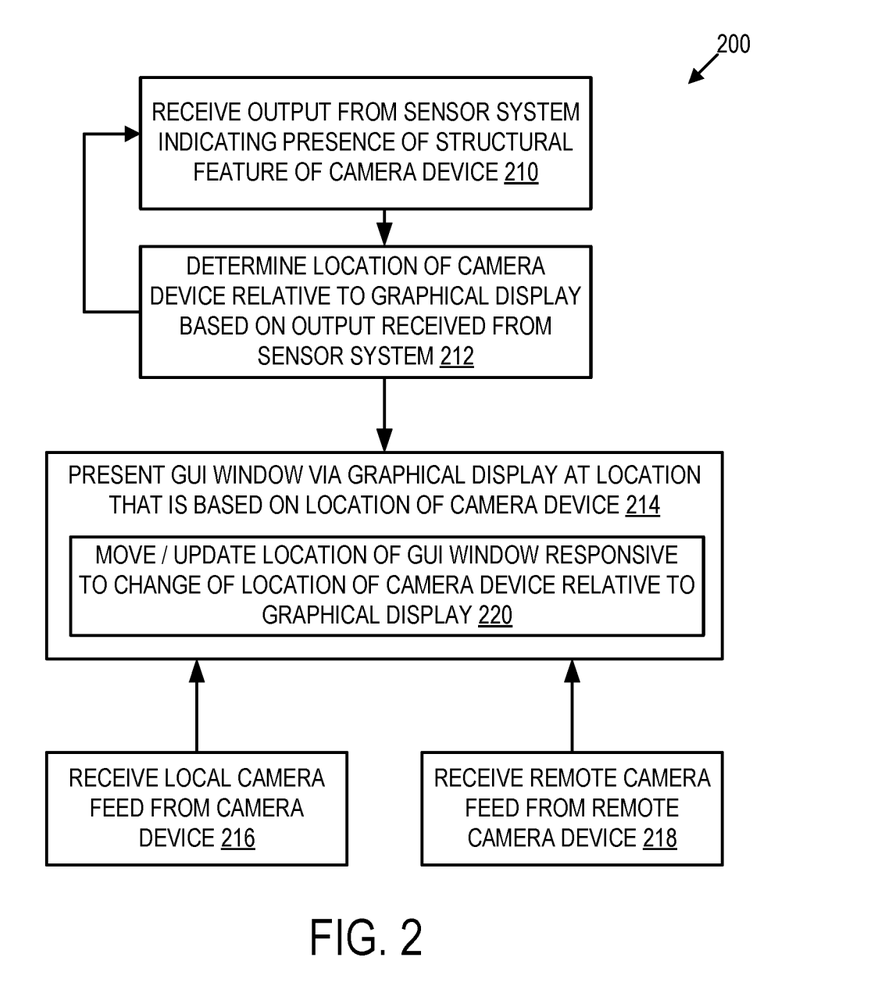
FIG. 2 is a flow diagram depicting an example method.

FIG. 2 is a flow diagram depicting an example method 200. Method 200 may be performed by a computing system that includes programming to implement the functionality described above with reference to FIG. 1. Additional aspects of a computing system are described with reference to FIG. 8.

At 210, method 200 includes receiving an output from one or more sensors of a sensor system indicative of a presence of a structural feature of a camera device. The sensor system may include a plurality of sensors distributed at respective locations relative to a graphical display to detect the presence of the structural feature of the camera device. In at least some implementations, the structural feature of the camera device may be detected through magnetic or capacitive sensing, or through connection of an electronic connector of the camera device to a corresponding electronic connector of the display device. Examples of these various sensing techniques are described in further detail with reference to FIGS. 3-6.

Each sensor of the sensor system may output a corresponding sensor signal at 210 that represents a measurement of a physical parameter. In some examples, a signal may be output by a sensor of the sensor system only upon satisfaction of a particular condition, such as the sensor detecting a presence of the structural feature of the camera device. In other examples, a signal output by a sensor of the sensor system may take the form of a time-varying signal that varies responsive to a presence of the structural feature of the camera device. The output from each sensor may be received over a wired or wireless interface. The output received from a sensor may be compared to a threshold value or condition to determine whether the output indicates a presence of the structural feature of the camera device. This threshold value or condition may be pre-established, and may be stored as data at a computer-readable data storage machine, for example.

At 212, method 200 includes determining a location of the camera device relative to the display based on the output received from the one or more sensors of the sensor system. Each sensor of the sensor system has a respective location relative to the graphical display, and the output of that sensor may be attributed to the location of that sensor based on a pre-established relationship between the location of the sensor and an interface over which the output of that sensor is received. This pre-established relationship may be stored as data at a computer-readable data storage machine, for example.

At 214, method 200 includes presenting a GUI window for the camera device via the graphical display at a location that is based on the location of the camera device. The GUI window may include one or more of (1) a local camera feed received from the camera device at 216, (2) a remote camera feed received from a remote camera device at 218, (3) one or more graphical elements corresponding to user controls, and/or (4) other human-readable information in the form of text, graphical icons, etc. An example of a GUI window for a camera device is described in further detail with reference to FIG. 7.

The GUI window presented at 214 may occupy a limited sub-region of the graphical display, as depicted in FIG. 1 with reference to GUI windows 130 and 132. In some implementations, two or more GUI windows may be presented for the camera device, e.g. one for each camera of two or more cameras being used for a teleconference. In such examples, a first GUI window occupies the entire display region of the graphical display or a sub-portion of the display, and the other GUI windows each occupy only a portion of the display (e.g. a limited sub-region within the first GUI window).

The location, size, and/or orientation of the GUI window presented at 214 may have a pre-established spatial relationship to the location of the camera device. In at least some implementations, a reference location of the GUI window (e.g., a center of an exterior edge of the GUI window closest to the camera device or other suitable reference) may be presented at or within a predefined spatial area of the location of the camera device or an edge of the graphical display proximate to the location of the camera device (e.g. within a predefined quantity of pixels from the camera device). As an example, the GUI window may be presented directly beside or proximate to the camera device. As another example, the GUI window may partially or completely surround the camera device, and the camera device may be located at a predefined location within the GUI window, where the camera device is mounted to or resting upon the graphical display.

The orientation of the GUI window presented at 214 may be based on an orientation of the camera device and/or an orientation of the display device relative to a reference datum. As an example, the GUI window presented via the graphical display may maintain its orientation even if the camera device changes its orientation relative to its optical axis. As another example, the GUI window may change its orientation responsive to a change in an orientation of the graphical display to maintain the orientation of the GUI window relative to a global reference datum (e.g., a gravity vector) as detected by an accelerometer, inertial sensor, inclinometer, or other suitable sensor of the display device or camera device.

The local camera feed received from the camera device (i.e., a local camera device) at 216 may be received over a wired or wireless interface of a computing system (i.e., local computing system), depending on implementation. The remote camera feed received from the remote camera device at 218 may be associated with a communications session between a remote computing system of the remote camera device and a local computing system of the display device and the camera device. The remote camera feed may be received via a communications network over a wired or wireless interface of the local computing system. The local camera feed may be transmitted from the local computing system to the remote computing system via the communications network, over a wired or wireless interface of the local computing system.

Operations 210 and 212 may be repeatedly performed in combination with operation 214 to determine whether the location of the camera device has changed relative to the graphical display. At 220, the location of the GUI window presented at 214 may be moved or otherwise updated responsive to a change of the location of the camera device relative to the graphical display. As an example, FIG. 1 depicts the location of GUI window 130 being moved or otherwise updated from location 130A to 130B to 130C as camera device 120 is moved from location 120A to 120B to 120C along an exterior edge of graphical display 112. As another example, FIG. 1 depicts the location of GUI window 132 being moved or otherwise updated from location 132A to 132B as camera device 122 is moved from location 122A to 122B within the display region of graphical display 112.

Figure 3A:
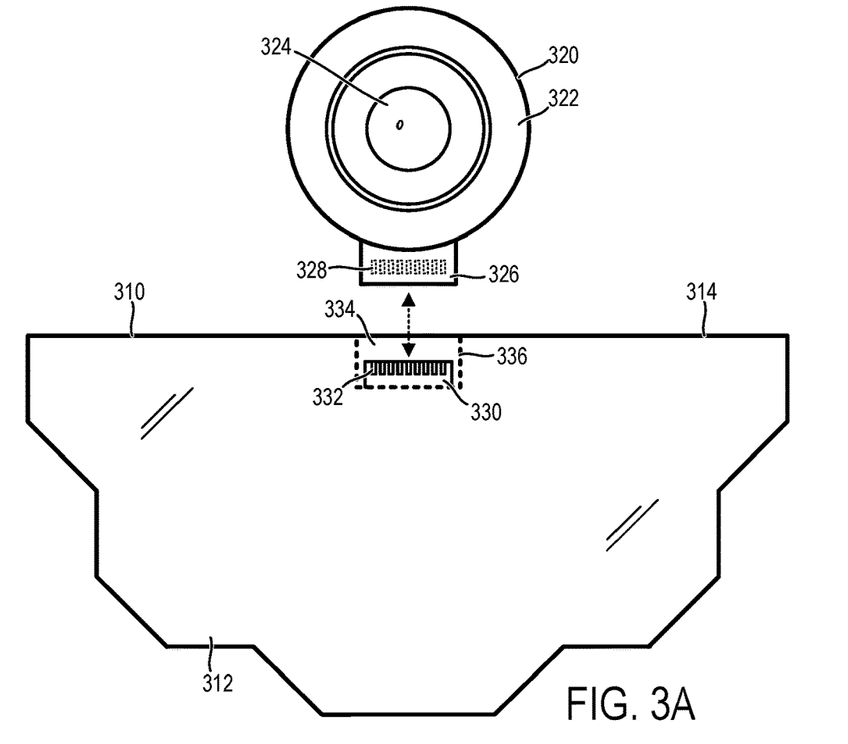
FIGS. 3A and 3B depict aspects of a display device and a camera device according to a first example implementation.
Figure 3B:
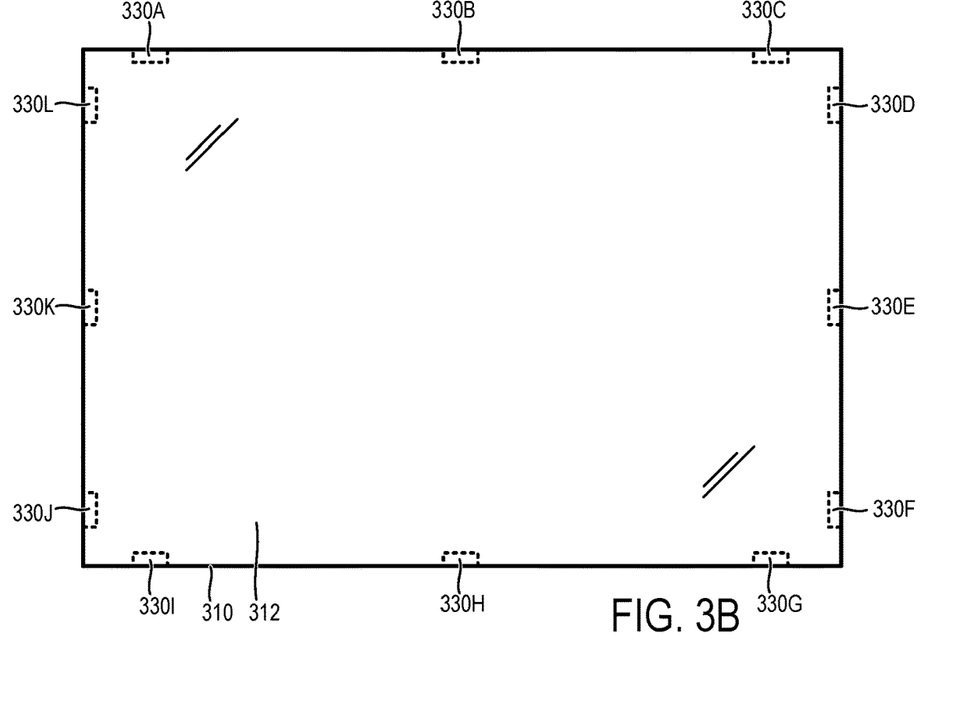

FIGS. 3A and 3B depict aspects of a display device 310 and a camera device 320 according to a first example implementation. In FIGS. 3A and 3B, display device 310 is an example of previously described display device 110, and camera device 320 is an example of previously described camera device 120 of FIG. 1. In this example implementation, camera device 320 interfaces with display device 310 via a wired interface that takes the form of a pair of electronic connectors. A location of the camera device relative to the display device is detected via electrical interaction between the electronic connectors of the camera device and the display device.

In FIG. 3A, camera device 320 is depicted in further detail including a device body 322, optical components 324 including a lens and an optical sensor, and a camera-side electronic connector 326. Connector 326 includes a set of electrically conductive pins 328 arranged in a pin-out pattern over which electrical power, ground reference, and/or signals may be exchanged with a corresponding connector.

Display device 310 is also depicted in further detail in FIG. 3A, including a graphical display 312 and a display-side electronic connector 330 located along an exterior edge 314 of the display device. Connector 330 includes a set of electrically conductive pins 332 arranged in a pin-out pattern over which electrical power, ground reference, and/or signals may be exchanged with a corresponding connector, such as camera-side electronic connector 326. The pin-out pattern of conductive pins 332 correspond to the pin-out pattern of camera-side connector 326, enabling electrical connections to be established between pins 332 of connector 330 and corresponding pins 328 of connector 326.

Display-side electronic connector 330 may be disposed within or combined with a connector port 334 that is formed within a body 336 of display device 310. In this configuration, connector 330 may correspond to a female connector and connector 326 may correspond to a male connector of a connector pair. In another example, connector 326 may correspond to a female connector and connector 330 may correspond to a male connector. However, it will be understood that connectors 326 and 330 may take other suitable forms, including configurations in which connectors 326 and 330 are aligned and held in contact with each other by magnetic attraction. For example, camera device 320 and/or display device 310 may include magnetic elements located within the device body near or integrated within their respective connectors 326 and 330 that attract corresponding magnetic or ferromagnetic elements of the other device.

As previously described with reference to FIG. 1, a graphical display, such as graphical display 312, may extend to an edge of display device 310, which may enable multiple display devices to be tiled to form a larger composite graphical display. In this configuration, display-side electronic connector 330 may be located behind graphical display 312 as viewed from the front of the display device. However, display device 310 may have other configurations, including a configuration in which graphical display 312 is surrounded by a frame that displaces an exterior edge of graphical display 312 inward from an exterior edge of display device 310.

FIG. 3B depicts display device 310 having a plurality of display-side electronic connectors 330 distributed at respective locations 330A-330L relative to graphical display 312 by which a presence of a structural feature of camera device 320 may be detected. For example, location 330C of connector 330 may correspond to the previously depicted location 120A of camera device 120 of FIG. 1.

In the example implementation of FIGS. 3A and 3B, the structural feature of camera device 310 may be camera-side electronic connector 326 or electronic components within the camera device, and the sensor system includes the display-side electronic connector 330 located at 330A-330L. For example, a presence of the camera device may be detected by establishing an electrically conductive bridge between two electrical contacts of the display-side electronic connector 330 via the camera-side electronic connector 326 that interfaces with connector 330. In this example, a presence of the camera device may be detected at a particular display-side electronic connector (330A-330L) without requiring that the camera device actively communicate according to a pre-established protocol. Rather, the presence of the camera device may be detected by detecting a voltage, ground reference, or other electrical value that traverses two or more electrical contacts of connector 330 via connector 326 or other electrical component of the camera device. One or more sensors of the sensor system of the display device may be provided to detect a change to an electrical property of each display-side electronic connector by which the location of the camera device may be determined.

FIGS. 4A, 4B, 4C, and 4D depict aspects of a display device 410 and a camera device 420 according to a second example implementation. In FIGS. 4A, 4B, 4C, and 4D display device 410 is an example of previously described display device 110, and camera device 420 is an example of previously described camera device 120 of FIG. 1. In this example implementation, a location of camera device 420 relative to display device 410 is detected via magnetic interaction between the camera device and the display device.

Figure 4A:
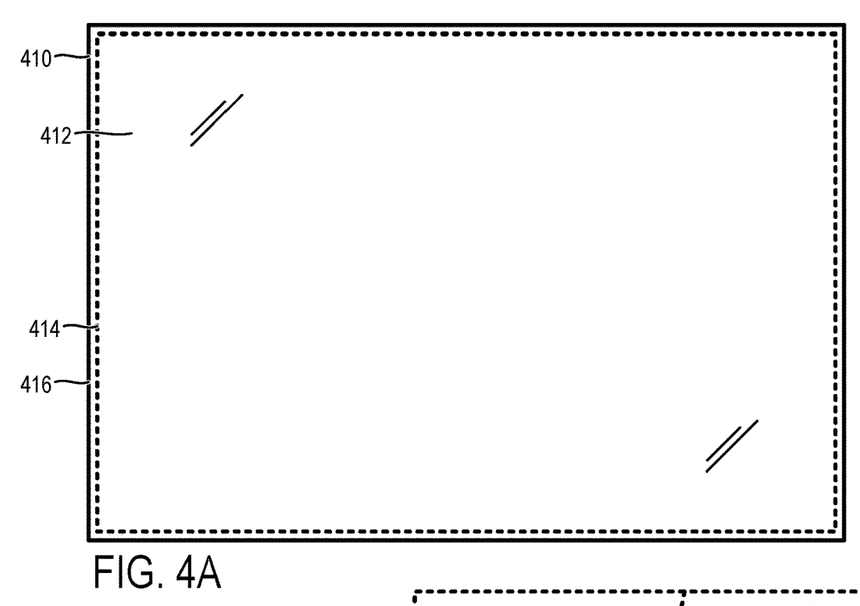
FIGS. 4A, 4B, 4C, and 4D depict aspects of a display device and a camera device according to a second example implementation.

FIG. 4A depicts display device 410 including a graphical display 412. Display device 410 further includes a sensor system 414 that is distributed along an exterior edge 416 of the display device. As previously described with reference to FIG. 1, graphical display 412 may extend completely or nearly to an edge of display device 410 (e.g., in the case of a thin or rear-mounted bezel), which may enable multiple display devices to be tiled to form a larger composite display. In this configuration, sensor system 414 may be located behind graphical display 412 as viewed from the front of the display device. However, display device 410 may have other configurations, including a configuration in which graphical display 412 is surrounded by a more substantial bezel that displaces an exterior edge of graphical display 412 inward from exterior edge 414 of the display device. In this configuration, sensor system 414 may be located within the frame of display device 410.

Figures 4B, 4C, 4D:
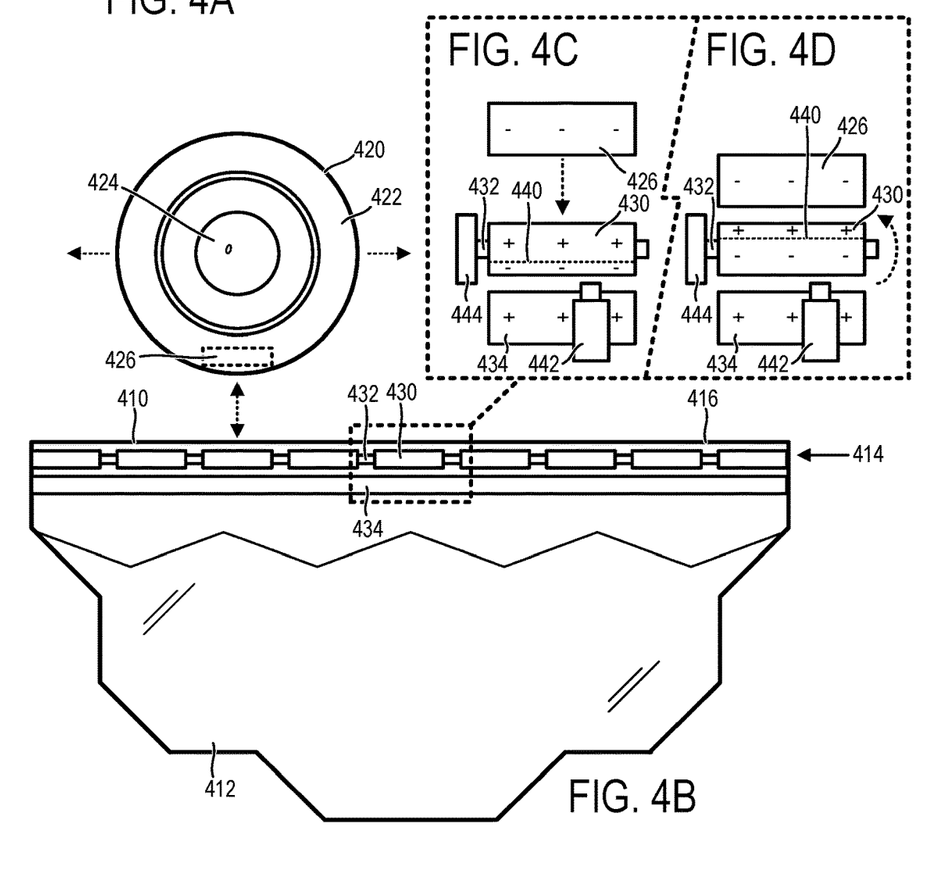

FIG. 4B depicts camera device 420 including a device body 422, optical components 424 including a lens and an optical sensor, and a camera-side magnetically-interactive element 426. Element 426 may take the form of a magnet or a ferromagnetic material. In FIG. 4B, display device 410 is also depicted in further detail, including aspects of sensor system 414. Sensor system 414 may include a set of barrel magnets 430 located along exterior edge 414 of graphical display 412 that rotate responsive to the presence of the camera-side magnetically-interactive element 426 of camera device 420. Each barrel magnet 430 may rotate about an axis 432 that is parallel to exterior edge 414. Sensor system 414 may further include a set of one or more display-side magnetically-interactive elements 434 that urge the set of barrel magnets toward a first rotational position in the absence of camera device 420. Element 434 may take the form of a magnet or a ferromagnetic material.

FIGS. 4C and 4D depict aspects of sensor system 414 in further detail. In FIG. 4C, display-side magnetically-interactive element 434 is initially urging barrel magnet 430 toward a first rotational position. Barrel magnet 430 may have positive and negative poles that are separated by a boundary 440 that is parallel to axis 432. In FIG. 4C, camera-side magnetically-interactive element 426 is approaching sensor system 414, but not yet within range to be detected by the sensor system. In FIG. 4D, camera 420 is mounted to exterior edge 414 of display device 410, and element 426 is within detection range of sensor system 414. Element 426 causes rotation of barrel magnet 430 as indicated by a change of position of boundary 440 due to the magnetic attraction of element 426 exceeding the magnetic attraction of element 434.

A variety of sensor types may be used to detect the presence of camera-side magnetically-interactive element 426 of camera device 420. As an example, sensor system 414 may include one or more transducers 442 (e.g., Hall effect sensors or other suitable sensors) that vary an output voltage responsive to rotation of one or more of the plurality of barrel magnets 430. In this example, the barrel magnets may form part of the sensor system. As another example, barrel magnets 430 may be omitted, and transducers 442 may be distributed along the exterior edge of the display device to detect a presence of element 426 as a magnetic element. However, advantages of the barrel magnets include their ability to secure the camera device to the display device as well as the ability to secure multiple instances of the display device to each other to form a composite graphical display. As yet another example, an angular rotation and/or position of barrel magnets 430 about axis 432 may be detected by respective potentiometers 440 as sensors of the sensor system. In still further examples, optical sensing by a plurality of sensors of the sensor system may be used to detect an angular rotation and/or position of barrel magnets 430 about axis 432.

Figure 5A:
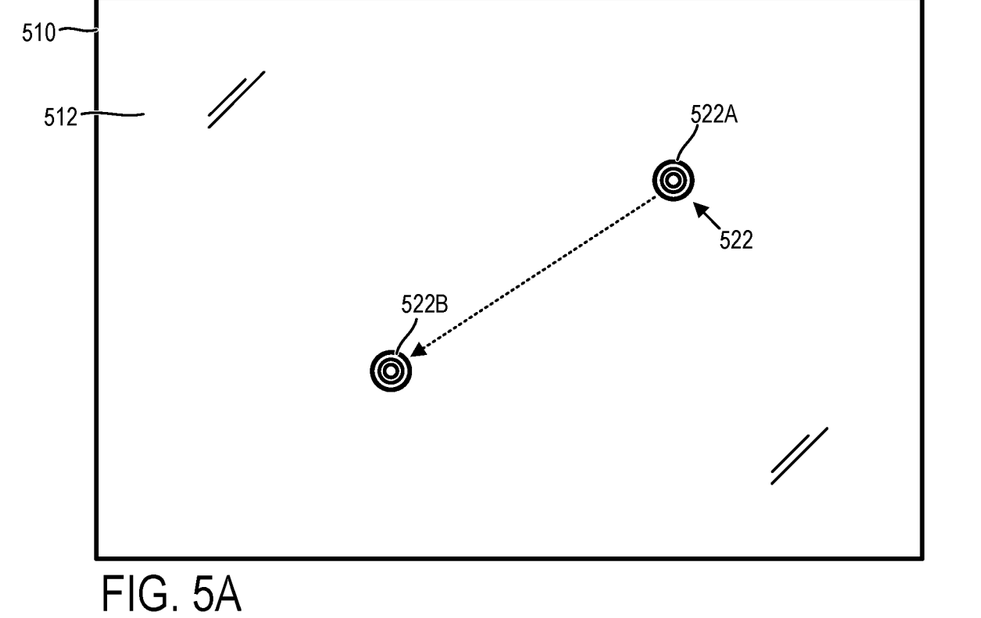
FIGS. 5A, 5B, and 5C depict aspects of a display device and a camera device according to a third example implementation.
Figure 5B:
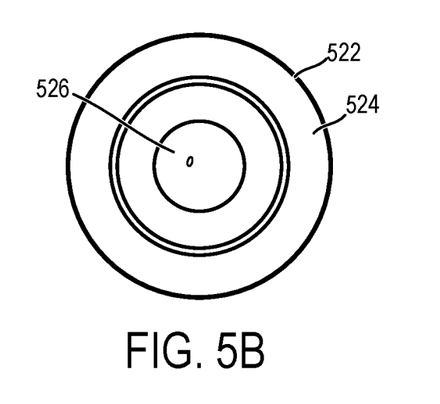
Figure 5C:
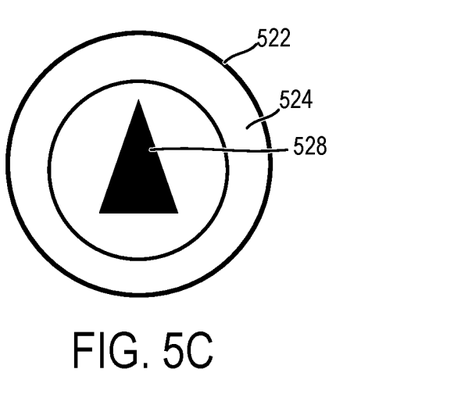

FIGS. 5A, 5B, 5C depict aspects of a display device 510 and a camera device 522 according to a third example implementation. In FIGS. 5A, 5B, and 5C, display device 510 is an example of previously described display device 110, and camera device 522 is an example of previously described camera device 122 of FIG. 1. In this example implementation, a location of camera device 522 relative to display device 510 is detected via capacitive interaction between the camera device and the display device.

Display device 510 includes a capacitive graphical display 512. A structural feature of camera device 522 in the form of a capacitive marker interfaces with the capacitive graphical display. Camera device 522 may be moved between locations (e.g., 522A and 522B) within a display region of capacitive graphical display 512. A location and an identity of the camera device may be detected based on the capacitive marker contacting the capacitive graphical display. For example, the capacitive marker may be sufficiently unique in shape and/or size to serve as an identifier that the object contacting the capacitive graphical display is a camera device.

FIG. 5A depicts capacitive graphical display 512 including a capacitive array of capacitive sensors distributed across the display region of the graphical display. In a typical configuration, a face of graphical display 512 is formed of a transparent glass or other suitable material, and the capacitive array resides on an opposite side of the face of the graphical display. The capacitive array may detect capacitively-interactive objects physically contacting the face of graphical display 512, such as a finger, stylus, or a capacitive marker of camera device 522.

FIG. 5B depicts a front side of camera device 522 in further detail, including a device body 524 and optical components 526 including a lens and an optical sensor. FIG. 5C depicts a rear side of camera device 522 in further detail, including device body 524 upon which a capacitive marker 528 is provided. Capacitive marker 528, upon contacting a face of graphical display 512, may be recognized via the capacitive array as belonging to camera device 522. In some examples, a capacitive marker may have a shape or form that unambiguously indicates an orientation of the camera device relative to the display device. It will be understood that a capacitive marker may take various forms, and that capacitive marker 528 is an example of a capacitive marker. The particular capacitive marker that is chosen for a camera device may be pre-established and stored as a data item in a computer-readable data storage machine, which enables that capacitive marker to be referenced for detection of the camera device.

In at least some implementations, camera device 522 may be mounted to a face of graphical display 512 by magnetic interaction between camera device 522 and display device 510. For example, one or both of camera device 522 and/or display device 510 may include a magnetic element and the other device may include a magnetically-interactive element in the form of a magnet or ferromagnetic material. The display device may include an array of magnets or a layer or array of a ferromagnetic material that is distributed across graphical display 512 (e.g. behind the graphical display) to which camera device 522 is attracted.

Figure 6A:
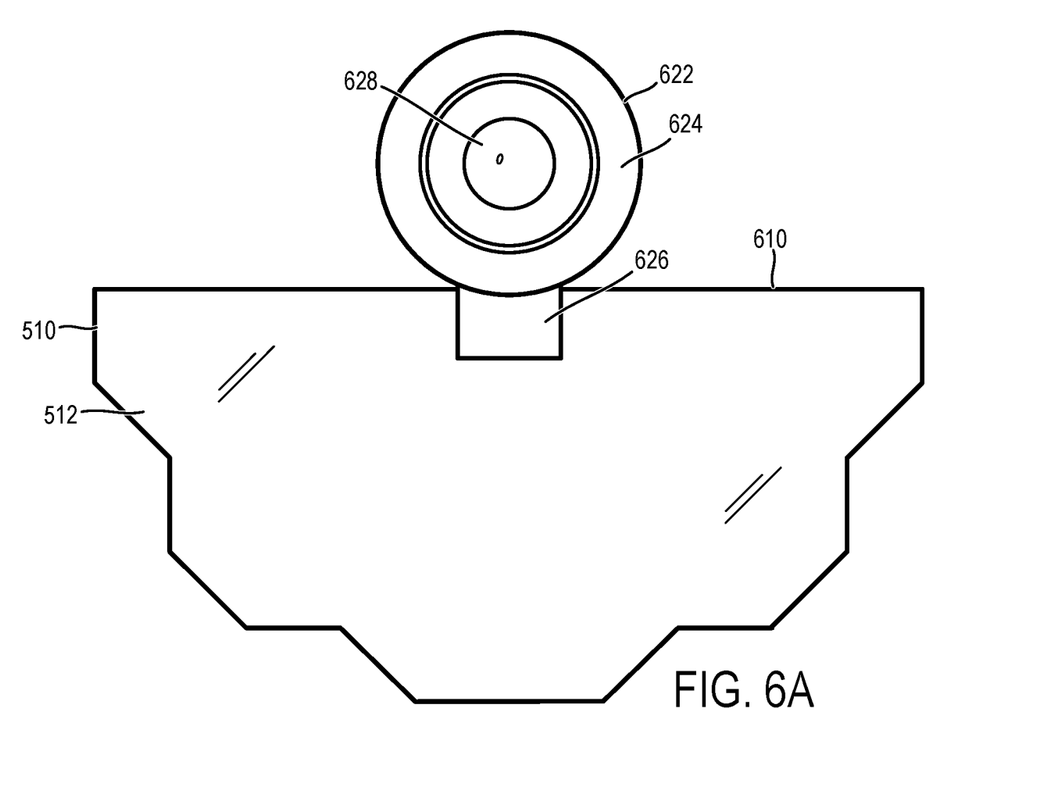
FIGS. 6A, 6B, 6C depict aspects of a display device and a camera device according to a fourth example implementation.
Figure 6B:
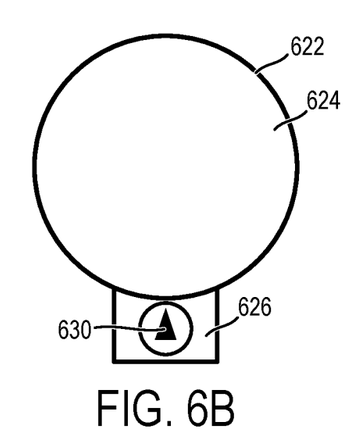
Figure 6C:
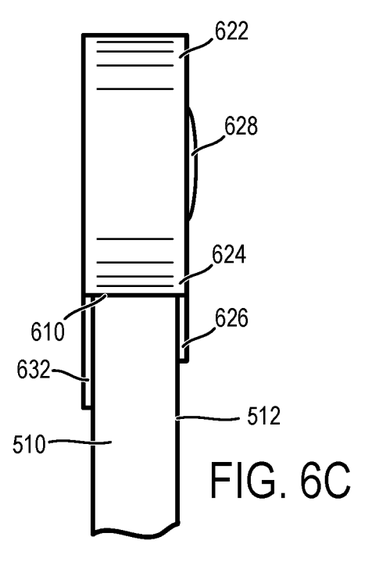

FIGS. 6A, 6B, 6C depict aspects of previously described display device 510 and a camera device 622 according to a fourth example implementation. Display device 510 includes capacitive graphical display 512 as previously described with reference to FIG. 5. Camera device 622 is an example of previously described camera device 122 of FIG. 1. In this example implementation, a location of camera device 622 relative to display device 510 is again detected via capacitive interaction between the camera device and the display device.

Camera device 622 includes a device body 624 having a body portion 626 that overlaps with a portion of the capacitive graphical display 512. Camera device 622 further includes optical components 628 including a lens and an optical sensor. FIG. 6B depicts a rear view of camera device 622. An external surface of body portion 626 includes a capacitive marker 630 that contacts capacitive graphical display 512 when the camera device is mounted to the display device. In some examples, a capacitive marker may have a shape or form that unambiguously indicates an orientation of the camera device relative to the display device. It will be understood that a capacitive marker may take various forms, and that capacitive marker 630 is an example of a capacitive marker. The particular capacitive marker that is chosen for a camera device may be pre-established and stored as a data item in a computer-readable data storage machine, which enables that capacitive marker to be referenced for detection of the camera device.

FIG. 6C depicts a side view of camera device 622 mounted along an exterior edge 610 of display device 510. Camera device 622 may be moved along an exterior edge of display device 510. The location and identity of the camera device may be detected based on capacitive marker 630 that contacts capacitive graphical display 512. Device body 624 may further include another body portion 632 that opposes body portion 624 to facilitate mounting of camera device 622 to display device 510.

Figure 7:
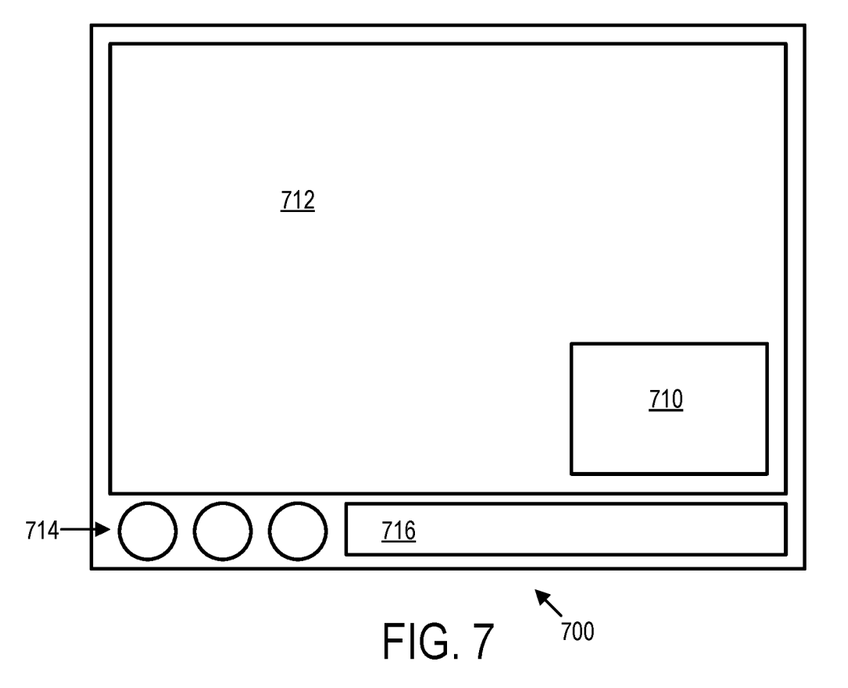
FIG. 7 depicts an example graphical user interface window for a camera device.

FIG. 7 depicts an example GUI window 700 for a camera device. GUI window 700 may include one or more of a local camera feed 710 that is received from a local camera device of a local computing system, a remote camera feed 712 received from a remote camera device, one or more graphical elements corresponding to user controls 714, and/or human-readable information 716 in the form of text, graphical icons, etc.

In at least some implementations, the methods and processes described herein may be tied to a computing system of one or more computing devices. In particular, such methods and processes may be implemented as a computer-application program or service, an application-programming interface (API), a library, and/or other computer-program product.

Figure 8:
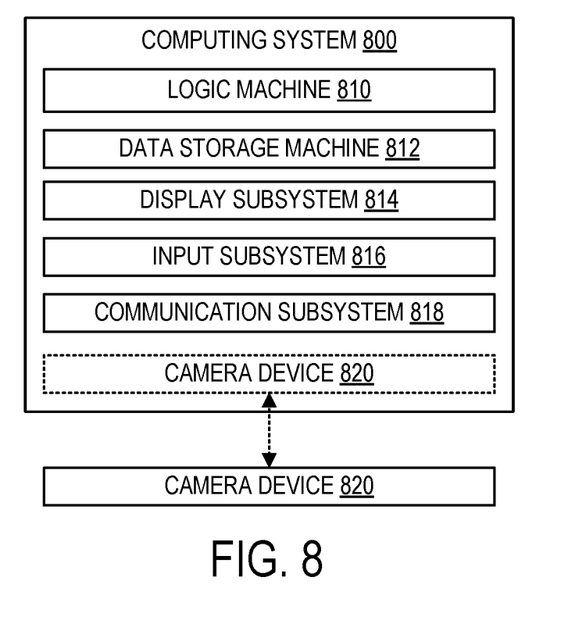
FIG. 8 depicts an example computing system.

FIG. 8 schematically shows an example of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 810 and a data storage machine 812. Computing system 800 may optionally include a display subsystem 814, input subsystem 816, communication subsystem 820, camera device 822, and/or other components not shown in FIG. 8.

Logic machine 810 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 812 includes one or more physical devices configured to hold instructions executable by the logic machine to implement the methods and processes described herein. When such methods and processes are implemented, the state of storage machine 812 may be transformed—e.g., to hold different data.

Storage machine 812 may include removable and/or built-in devices. Storage machine 812 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine ?? may include volatile, nonvolatile, dynamic, static, read/write, read-only, random-access, sequential-access, location-addressable, file-addressable, and/or content-addressable devices.

It will be appreciated that storage machine 812 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 810 and storage machine 812 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 810 executing instructions held by storage machine 812. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 814 may be used to present a visual representation of data held by storage machine 812. This visual representation may take the form of a graphical user interface (GUI). As the herein described methods and processes change the data held by the storage machine, and thus transform the state of the storage machine, the state of display subsystem 814 may likewise be transformed to visually represent changes in the underlying data. Display subsystem 814 may include one or more display devices utilizing virtually any type of technology. Such display devices may be combined with logic machine 810 and/or storage machine 812 in a shared enclosure, or such display devices may be peripheral display devices.

When included, input subsystem 816 may comprise or interface with a sensor system for detecting a presence of camera device 820. Input subsystem 816 may further include one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Examples of other sensors of input subsystem 816 may include a microphone, an infrared, color, stereoscopic, and/or depth camera, a head tracker, eye tracker, accelerometer, inertial sensor, inclinometer, and/or gyroscope for motion/orientation detection and/or intent recognition, as well as electric-field sensing componentry for assessing brain activity.

When included, communication subsystem 818 may be configured to communicatively couple computing system 800 with one or more other computing devices. Communication subsystem 800 may include wired and/or wireless communication devices compatible with one or more different communication protocols. As examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides a computing system comprising a display; a sensor system including a plurality of sensors distributed at respective locations relative to the display to detect a presence of a structural feature of a camera device; and a computing device programmed to: receive an output from one or more sensors of the sensor system indicative of the presence of the structural feature of the camera device; determine a location of the camera device relative to the display based on the output received from the one or more sensors; and present a graphical user interface (GUI) window for the camera device via the display at a location that is based on the location of the camera device. In this example or any other example disclosed herein, the structural feature of the camera device includes a capacitive marker on an external surface of the camera device, and the display comprises a capacitive array as the sensor system. In this example or any other example disclosed herein, the camera device is mounted to an enclosure of the display and includes a body portion that overlaps with and contacts a portion of the display in which the body portion has the external surface that includes the capacitive marker. In this example or any other example disclosed herein, the structural feature of the camera device includes one or more magnetic elements; and the plurality of sensors include one or more sensors configured to vary an output voltage responsive to the presence of the one or more magnets of the camera device. In this example or any other example disclosed herein, the structural feature of the camera device includes one or more magnetically-interactive elements; the sensor system includes a plurality of barrel magnets located along a perimeter of the display that rotate responsive to the presence of the one or more magnetically-interactive elements of the camera device; and the plurality of sensors detect a rotation of each of the plurality of barrel magnets. In this example or any other example disclosed herein, the plurality of sensors include one or more transducers that vary an output voltage responsive to rotation of one or more of the plurality of barrel magnets. In this example or any other example disclosed herein, the structural feature of the camera device is a camera-side electronic connector of the camera device; and the sensor system includes a plurality of display-side electronic connectors distributed along an exterior edge of the display. In this example or any other example disclosed herein, the location of the GUI is presented directly beside or proximate to the location of the camera device. In this example or any other example disclosed herein, the computing device is further programmed to receive a camera feed from the camera device and to present the camera feed via the GUI window. In this example or any other example disclosed herein, the computing device is further programmed to present one or more user controls for the camera device via the GUI window. In this example or any other example disclosed herein, the computing device is further programmed to: receive a camera feed from the camera device and to transmit the camera feed to a remote computing system; and receive a remote camera feed from the remote computing system and to present the remote camera feed via the GUI window. In this example or any other example disclosed herein, the computing device is further programmed to: move the location of the GUI window presented via the display responsive to a change of the location of the camera device relative to the display determined based on an output received from the sensor system. In this example or any other example disclosed herein, the GUI window is a sub-region of the display. In this example or any other example disclosed herein, the computing system further comprises the camera device Another example provides a method performed by a computing system, the method comprising receiving an output from one or more sensors of a sensor system indicative of a presence of a structural feature of a camera device relative to a display; determining a location of the camera device relative to the display based on the output received from the one or more sensors; and presenting a graphical user interface (GUI) window for the camera device via the display at a location that is based on the location of the camera device. In this example or any other example disclosed herein, the structural feature of the camera device includes a capacitive marker on an external surface of the camera device; and the display comprises a capacitive array as the sensor system. In this example or any other example disclosed herein, the structural feature of the camera device includes one or more magnetic elements; and the plurality of sensors include one or more sensors configured to vary an output voltage responsive to the presence of the one or more magnets of the camera device. In this example or any other example disclosed herein, the structural feature of the camera device includes one or more magnetically-interactive elements; the sensor system includes a plurality of barrel magnets located along a perimeter of the display that rotate responsive to the presence of the one or more magnetically-interactive elements of the camera device; and the plurality of sensors detect a rotation of each of the plurality of barrel magnets. In this example or any other example disclosed herein, the structural feature of the camera device is a camera-side electronic connector of the camera device; and the sensor system includes a plurality of display-side electronic connectors distributed along an exterior edge of the display.

Another example provides a computing system comprising a display; a camera device including a structural feature that is one or more of capacitively-interactive and magnetically-interactive; a sensor system including a plurality of sensors distributed at respective locations relative to the display to detect a presence of the structural feature of the camera device; a logic machine; and a data storage machine having instructions stored thereon executable by the logic machine to: receive an output from one or more sensors of the sensor system indicative of the presence of the structural feature of the camera device; determine a location of the camera device relative to the display based on the output received from the one or more sensors; and present a graphical user interface (GUI) window for the camera device via the display at a location that is directly beside or proximate to the location of the camera device, the GUI window being a sub-region of the display and containing a camera feed of the camera device and/or user controls for the camera device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
 a display comprising an enclosure and a sensor system, wherein the sensor system includes a plurality of sensors comprising a capacitive array; and
 a computing device programmed to:
  receive an output from one or more sensors of the sensor system indicative of a presence of a structural feature of a camera device, the structural feature comprising a capacitive marker on an external surface of the camera device;
  determine a location of the camera device relative to the display based on the output received from the one or more sensors; and
  present a graphical user interface (GUI) window for the camera device via the display at a location that is based on the location of the camera device.

2. The computing system of claim 1, further comprising the camera device, and wherein the camera device is configured to be mounted to an enclosure of the display and includes a body portion that overlaps with and contacts a portion of the display, the body portion having the external surface that includes the capacitive marker.

3. The computing system of claim 1, wherein the location of the GUI is presented directly beside or proximate to the location of the camera device.

4. The computing system of claim 1, wherein the computing device is further programmed to receive a camera feed from the camera device and to present the camera feed via the GUI window.

5. The computing system of claim 1, wherein the computing device is further programmed to present one or more user controls for the camera device via the GUI window.

6. The computing system of claim 1, wherein the computing device is further programmed to:
receive a camera feed from the camera device and to transmit the camera feed to a remote computing system; and
receive a remote camera feed from the remote computing system and to present the remote camera feed via the GUI window.

7. The computing system of claim 1, wherein the computing device is further programmed to:
move the location of the GUI window presented via the display responsive to a change of the location of the camera device relative to the display determined based on an output received from the sensor system.

8. The computing system of claim 1, wherein the GUI window is a sub-region of the display.

9. The computing system of claim 1, further comprising the camera device.

10. A method performed by a computing system, the method comprising:
receiving an output from a sensor of a sensor system indicative of a presence of a structural feature of a camera device relative to a display, the structural feature of the camera device including one or more magnets;
determining a location of the camera device relative to the display based on the output received from the sensor, the sensor configured to vary an output voltage responsive to the presence of the one or more magnets of the camera device; and
presenting a graphical user interface (GUI) window for the camera device via the display at a location that is based on the location of the camera device.

11. The method of claim 10, wherein the sensor system includes a plurality of barrel magnets located along a perimeter of the display that rotate responsive to the presence of the one or more magnets of the camera device;
wherein the one or more sensors of the sensor system detect a rotation of each of the plurality of barrel magnets; and
wherein the output received from the one or more sensors indicates a rotation of one or more of the plurality of barrel magnets detected by the one or more sensors.

12. The method of claim 10, further comprising:
moving the location of the GUI window presented via the display responsive to a change of the location of the camera device relative to the display determined based on an output received from the sensor system.

13. The method of claim 12, wherein the location of the GUI is presented directly beside or proximate to the location of the camera device.

14. The method of claim 10, further comprising:
receiving a camera feed from the camera device or from a remote camera device via a communications network; and
presenting the camera feed via the GUI window.

15. A computing system, comprising:
a display;
a sensor system including a plurality of sensors distributed at respective locations relative to the display to detect a presence of a structural feature of a camera device, wherein
the structural feature of the camera device includes one or more magnetically-interactive elements,
the sensor system includes a plurality of barrel magnets located along a perimeter of the display that are configured to rotate responsive to the presence of the one or more magnetically-interactive elements of the camera device, and
the plurality of sensors of the sensor system are configured to detect a rotation of each barrel magnet of the plurality of barrel magnets; and
a computing device programmed to:
receive an output from one or more sensors of the sensor system indicative of the presence of the structural feature of the camera device;
determine a location of the camera device relative to the display based on the output received from the one or more sensors; and
present a graphical user interface (GUI) window for the camera device via the display at a location that is based on the location of the camera device.

16. The computing system of claim 15, wherein the plurality of sensors include one or more transducers that vary an output voltage responsive to rotation of one or more of the plurality of barrel magnets.

17. The computing system of claim 15, wherein the location of the GUI is presented directly beside or proximate to the location of the camera device.

18. The computing system of claim 15, wherein the computing device is further programmed to receive a camera feed from the camera device or from a remote camera device via a communications network, and to present the camera feed via the GUI window.

19. The computing system of claim 15, wherein the GUI window is a sub-region of the display; and
wherein the computing device is further programmed to:
move the location of the GUI window presented via the display responsive to a change of the location of the camera device relative to the display determined based on an output received from the sensor system.

20. The computing system of claim 15, further comprising the camera device.

* * * * *